(12) United States Patent
Singh

(10) Patent No.: US 6,416,305 B1
(45) Date of Patent: Jul. 9, 2002

(54) TIRE CURING PRESS CENTER MECHANISM

(75) Inventor: Anand P. Singh, Akron, OH (US)

(73) Assignee: McNeil & NRM, Inc., Akron, OH (US)

( * ) Notice: Subject to any disclaimer, the term of this patent is extended or adjusted under 35 U.S.C. 154(b) by 0 days.

(21) Appl. No.: 09/178,842

(22) Filed: Oct. 26, 1998

(51) Int. Cl.$^7$ ............................................ B29C 35/02
(52) U.S. Cl. .......................... 425/29; 425/38; 425/40; 425/48
(58) Field of Search ...................... 425/29, 38, 40, 425/43, 48, 52, 58

(56) References Cited

U.S. PATENT DOCUMENTS

| | | | |
|---|---|---|---|
| 2,495,664 A | 1/1950 | Soderquist | |
| 2,699,572 A | 1/1955 | Soderquist | |
| 2,730,763 A | 1/1956 | Brundage | |
| 2,775,789 A | 1/1957 | Soderquist | |
| 2,808,618 A | 10/1957 | Soderquist | |
| 2,970,342 A | 2/1961 | Frölich et al. | |
| 3,976,409 A | 8/1976 | Athey | 425/48 |
| 4,863,360 A * | 9/1989 | Chuchanis | 425/48 |
| 4,872,822 A * | 10/1989 | Pizzorno | 425/48 |
| 4,950,141 A * | 8/1990 | Maikuma et al. | 425/48 |
| 5,393,480 A * | 2/1995 | Pizzorno | 425/48 |
| 5,641,521 A | 6/1997 | Sarumaru | 425/38 |
| 5,776,507 A * | 7/1998 | Ureshino et al. | 425/48 |
| 5,776,508 A | 7/1998 | Irie | 425/36 |
| 5,798,123 A | 8/1998 | Mitamura et al. | 425/29 |
| 6,062,837 A * | 5/2000 | Fukuda | 425/48 |

FOREIGN PATENT DOCUMENTS

| | | |
|---|---|---|
| GB | 1388055 | 3/1975 |
| JP | 03 236912 | 10/1991 |

* cited by examiner

Primary Examiner—James P. Mackey
(74) Attorney, Agent, or Firm—Renner, Kenner, Greive, Bobak, Taylor & Weber

(57) ABSTRACT

Apparatus for manipulating a bladder (25) relative to a tire (B) in a tire curing press (11) including, a lower plate ring (31) for carrying a lower bead (26) of the bladder, an upper plate ring (50) for carrying an upper bead (27) of the bladder, a first cylinder mechanism (35) for selectively moving the lower plate ring and the upper plate ring, a piston rod (56) attached to the upper plate ring and extending through the lower plate ring, a second cylinder mechanism (55) located within the first cylinder mechanism for selectively actuating the piston rod to move the upper plate ring relative to the lower plate ring, a stretch-height control mechanism (57) for controlling the position of the upper plate ring relative to the lower plate ring upon actuation of the second cylinder, and a bladder detector mechanism (110) for positioning the upper plate ring at a predetermined position relative to a tire in the tire curing press.

14 Claims, 9 Drawing Sheets

TIRE CURING PRESS CENTER MECHANISM

TECHNICAL FIELD

The present invention relates generally to presses for shaping and curing tires. More particularly, the present invention relates to apparatus for positioning an uncured tire relative to a press for shaping and curing tires wherein the uncured tire is positioned and manipulated by a unique bag control or center mechanism configuration. More specifically, the present invention relates to a center mechanism which is highly versatile in terms of being adapted for optimum performance in different types of tire curing presses and for shaping and curing tires of differing sizes and configurations.

BACKGROUND ART

Numerous types of presses for shaping and curing tires have been developed over the years. One major construction feature of such presses is the mechanism for actuating the upper and lower mold sections for opening and closing the press to permit removal of a cured tire and insertion of an uncured tire on the one hand and the controlled pressurizing and heating of the tires within the mold sections on the other hand. In this respect, successful mechanisms for opening and closing presses have been developed that feature both mechanical and hydraulic actuation.

Another significant feature of such tire curing presses is the center mechanism, which provides the primary interaction between the press and a tire band being processed by the press, particularly during the manipulations of loading and unloading tires into the press. While various types of center mechanisms have been developed over the years, the most universally accepted have employed a flexible, generally cylindrical bladder or bag member that is secured to the press and that is capable of manipulation to be inserted within a tire band, radially distended in order to apply shaping pressure and curing pressure and heat to the interior of the tire band, and to strip the bladder from the tire after the curing process is completed. The factors involved in operation of a center mechanism bladder in conjunction with conventional bias-ply tires was relatively simple due to the cylindrical form of the uncured tire. With the wide acceptance of radial-ply tires, bladder manipulations assumed more complex and significant implications. Since uncured or green radial tire carcasses must be at least partially preformed before the breaker ply is positioned and affixed, the bead portions are, therefore, necessarily in closer axial proximity to each other in that the preformed tire band approximates, to a substantial extent, the configuration of the cured tire, as contrasted with the substantially cylindrical uncured configuration of a conventional bias-ply tire. As a result, the bead-to-bead dimension interiorly of a preformed radial tire substantially exceeds the axial distance between the beads. Therefore, a bladder or bag that has an axial extent that approximates the bead-to-bead dimension interiorly of a tire will, when axially upwardly extended to receive the tire, project a substantial distance above the upper bead of the tire. In such instances, movement of the upper and lower bead area of a bladder, together with control of the internal pressure, are significant in accurately concentrically locating the bladder within the tire to complete shaping and perform curing of a green radial tire band.

Center mechanisms employing a generally cylindrical bag or bladder member have assumed many forms in the commercial environment; however, it has been realized in recent years that the configuration of the bladder and its accuracy of placement within an uncured tire band are highly significant to the uniformity and, therefore, performance of the resultant cured tire. Many center mechanisms have inherent weaknesses or disadvantages based solely upon the construction of the bag or bladder and the manner in which it is attached to and manipulated by components of a center mechanism. For example, a bladder that is not symmetrical about both horizontal and vertical axes can readily lead to a lack of uniformity in the resultant tires. In instances where the bladder beads are fixed, the girth of the bladder is limited. In bladders having fixed beads at one end and a free end of the bladder, there is necessarily poor control over the free end of the bladder during bladder insertion into the uncured tire band. Further, in some instances, large volumes of curing media are required due to the bladder and center mechanism configuration. Most prior-art center mechanisms that are currently in commercial use suffer from one or more of the above limitations.

One prior-art center mechanism that is not subject to the above-described disadvantages is the Bag-O-Matic® center mechanism, which has been sold by Applicant's assignee for many years. These center mechanisms have a bladder that has symmetrical construction around both the horizontal and vertical axes to achieve the resultant quality and uniformity of tires. In addition, the center mechanism is capable of sizing the bladder to the bead diameter of tires being cured. This minimizes the unsupported bladder between the tire bead and the bladder clamp rings, thus eliminating the problems associated with variance in the stretch of unsupported areas of the bladder and the consequent effect on tire uniformity, particularly in the bead areas of the tires.

Possible disadvantages of the Bag-O-Matic® center mechanism involve the potential mixing of operating fluid for the bladder manipulation cylinder with the cure media in the bag or bladder. With cure media on one side of piston rod seals and hydraulic operating fluid, classically water, on the other side heat transferred to the seals from the curing media severely affect seal life and that of related mechanical components, even though made from high-cost customized materials. In instances where a gas-curing media is employed, these areas of concern are intensified. The center mechanisms have also required spacers to set up stack and stretch heights for the bag or bladder, thereby providing potential for error on an operator's part by selecting an improper spacer for a particular size. Thus, existing center mechanisms have all involved at least an extent of built-in or potential disadvantages that can materially affect tire quality and uniformity.

DISCLOSURE OF THE INVENTION

Therefore, an object of the present invention is to provide a tire curing press center mechanism having the capability of producing uniform, high-quality radial-ply tires. Another object of the invention is to provide such a press center mechanism that is capable of operating in conjunction with a wide variety of existing tire-loading and unloading devices without the necessity for alterations or modifications. A further object of the present invention is to provide such a press center mechanism that is capable of installation and use in a variety of existing presses, including both mechanical and hydraulic press designs that are currently utilized in the industry.

Another object of the present invention is to provide a tire curing press center mechanism that employs a bladder that is of symmetrical construction around both the horizontal and vertical axes. Yet a further object of the invention is to provide such a press center mechanism that is capable of sizing the bladder to accommodate differing bead diameters to thereby minimize the unsupported bladder area between the tire beads and the clamp rings for the bladder bead areas. Another object of the invention is to provide a tire press center mechanism that fully maintains these and other advantages of a conventional Bag-O-Matic® center mechanism.

Yet another object of the present invention is to provide a tire curing press center mechanism that eliminates possible disadvantageous features of a conventional Bag-O-Matic® center mechanism. Another object of the present invention is to provide such a center mechanism wherein the curing medium and the operating fluids for the center mechanism cylinders are completely separated, with individual optimumly designed seals maintaining the fluids within their operating components. Another object of the invention is to provide such a center mechanism wherein the curing media and operating media are physically spaced a substantial distance to preclude the transfer of heat from the curing media into the cylinder operating fluid. Yet a further object of the invention is to provide such a tire curing press wherein a cooling fluid may be circulated through the components joining the bladder containing the curing media and the cylinders containing operating fluid for manipulating the center mechanism components. Yet a further object of the invention is to provide such a center mechanism that eliminates operator error in misadjustment of stacking height, since the stacking height set-up may remain the same for all tire sizes unless it is desired to change the position of the bladder in relation to the top bead of the tires.

A further object of the invention is to provide a tire curing press center mechanism that employs commercially available cylinder technology. Yet a further object of the invention is to provide such a center mechanism that accommodates usage of cylinder operating fluids such as oil or water-glycol systems, where higher pressures can be readily utilized. Yet another object of the invention is to provide such a center mechanism wherein usage of higher pressure operating media for the cylinders permits the utilization of smaller cylinders and other components while providing the necessary actuating forces for manipulating the center mechanism components.

In general, the present invention contemplates a tire curing apparatus for manipulating a bladder relative to a tire in a tire curing press including, a lower plate ring for carrying a lower bead of the bladder, an upper plate ring for carrying an upper bead of the bladder, a first cylinder mechanism for selectively moving the lower plate ring and the upper plate ring, a piston rod attached to the upper plate ring and extending through the lower plate ring, a second cylinder mechanism located within the first cylinder mechanism for selectively actuating the piston rod to move the upper plate ring relative to the lower plate ring, a stretch-height control mechanism for controlling the position of the upper plate ring relative to the lower plate ring upon actuation of the second cylinder, and a bladder detector mechanism for positioning the upper plate ring at a predetermined position relative to a tire in the tire curing press.

PREFERRED EMBODIMENT FOR CARRYING OUT THE INVENTION

A center mechanism according to the concept of the present invention, as generally indicated by the numeral 10 in the attached drawings, may be incorporated in various types and constructions of presses designed to shape and cure tires. While the center mechanism 10 is shown in conjunction with an exemplary hydraulic press, it is equally adaptable to various hydraulic and mechanical presses.

Figure 1:
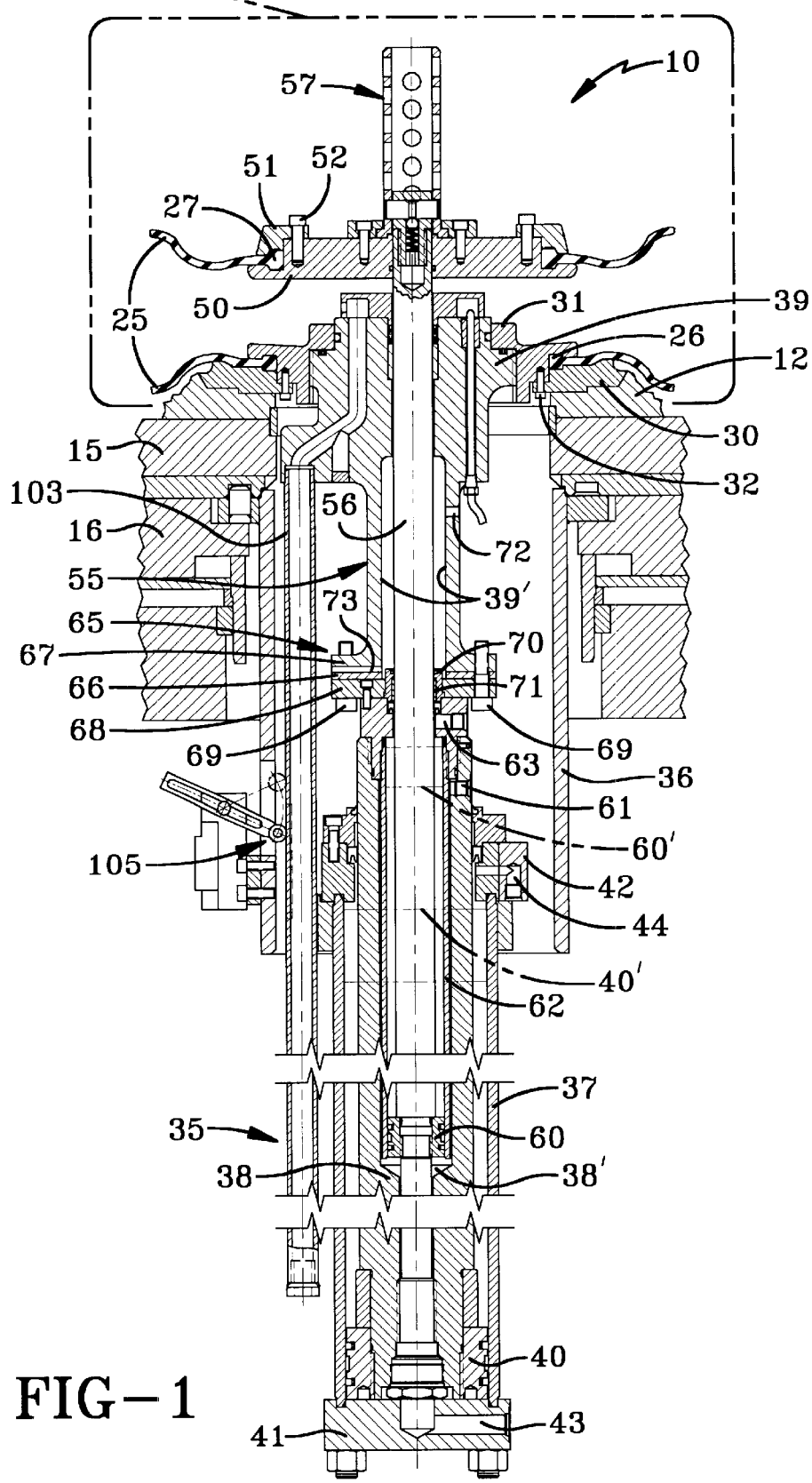
FIG. 1 is a fragmentary, vertical view partially in cross-section depicting a portion of a press for shaping and curing tires and equipped with a center mechanism embodying the concepts of the present invention.

Referring now to the drawings, and particularly to FIG. 1, a portion of a suitable press, generally indicated by the numeral 11, is shown in sufficient detail for an understanding of the structure and operation of the center mechanism 10. The press 11 is depicted as mounting a lower mold section 12 and a separable mating upper mold section (not shown) mounted on press head 13 (FIG. 5) in a conventional manner. It should be appreciated that the center mechanism 10 is equally suitable for use in conjunction with a press mounting segmented mold sections or adapted to mount both types of molds.

The lower mold section 12 is mounted on a platen 15 secured to bolster 16 attached to a portion of the base of the press 11. The upper mold section is preferably similarly mounted on a platen (not shown) that is selectively movable with respect to the platen 15.

Figure 5:
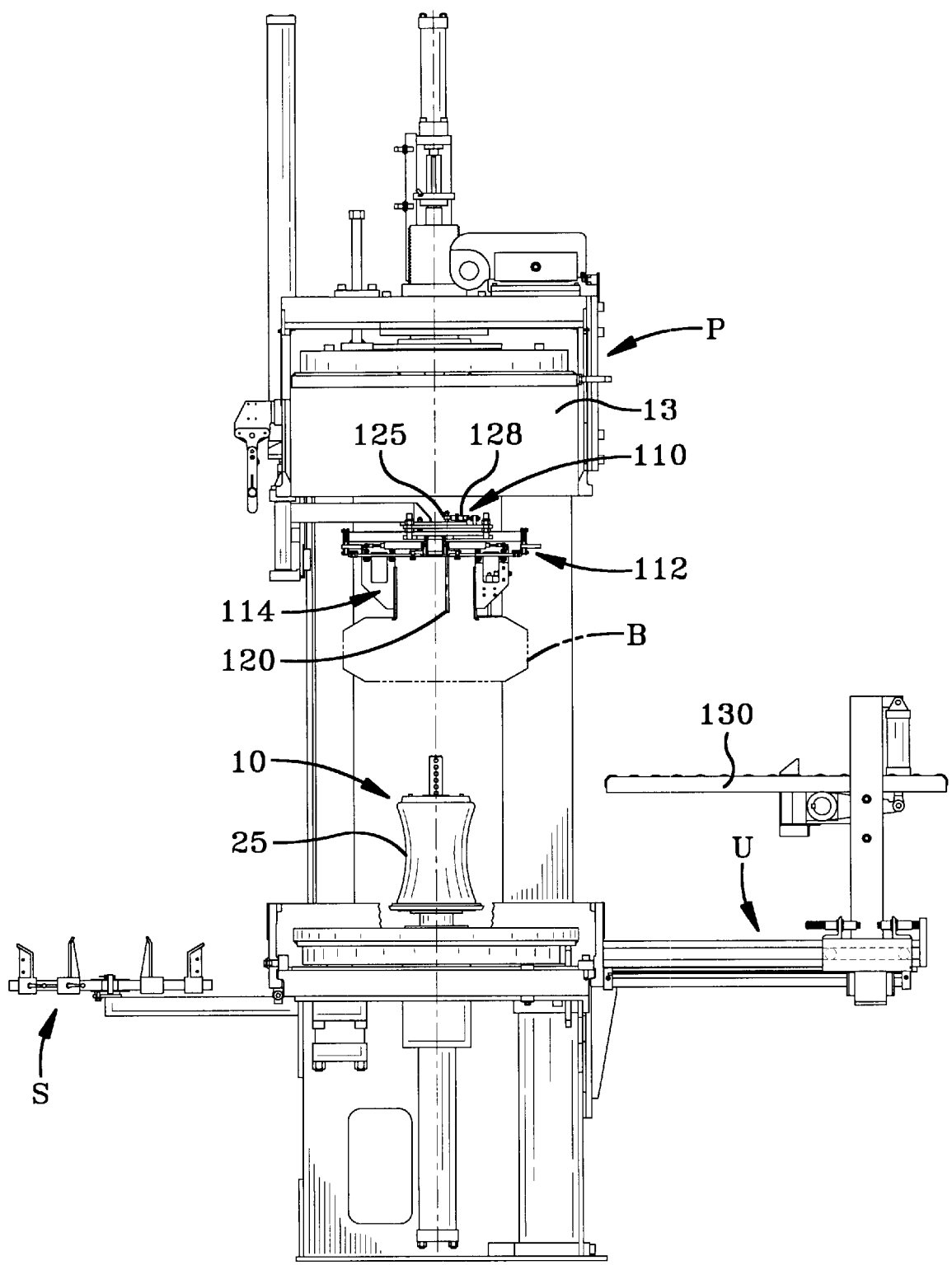
FIGS. 5–10 are a series of views of a tire curing press employing the center mechanism and bladder detector mechanism of the present invention in an exemplary sequence showing the loading, shaping, and curing of an uncured tire band and the subsequent removal of a cured tire band.

The bolster 16, platen 15, and lower mold section 12 are centrally apertured to receive the center mechanism 10. The portion of center mechanism 10 extending above the lower mold section 12 includes a flexible bladder, diaphragm or bag 25 that may be made of any number of suitable elastomeric materials well known to persons skilled in the art. As shown, the bag 25 is of the type that is open at both ends and is preferably of a generally annular configuration and symmetrical about a horizontal centerline thereof. Further, the bag 25 is preferably of a substantially uniform wall thickness to provide a uniform transmittal of temperature and pressure from internally thereof to all portions internally of an uncured or green tire band B that it contacts (FIG. 5).

The bladder or bag 25 has a lower bead area 26 and an upper bead area 27 (FIG. 1) that are sealingly clamped in a manner to be described to permit selective radial expansion and contraction of bag 25 upon the introduction of and withdrawal of fluids interiorly thereof. The lower bead area 26 of bag 25 is clamped between a lower bead ring 30, which provides a seat for the lower bead of uncured tire band B, and a lower plate ring 31. In order to permit bladder change for installing a different size bag 25 as for processing uncured tire bands of differing dimensions, the lower bead ring 30 and lower plate ring 31 are detachably secured as by bolts 32.

Figure 9:
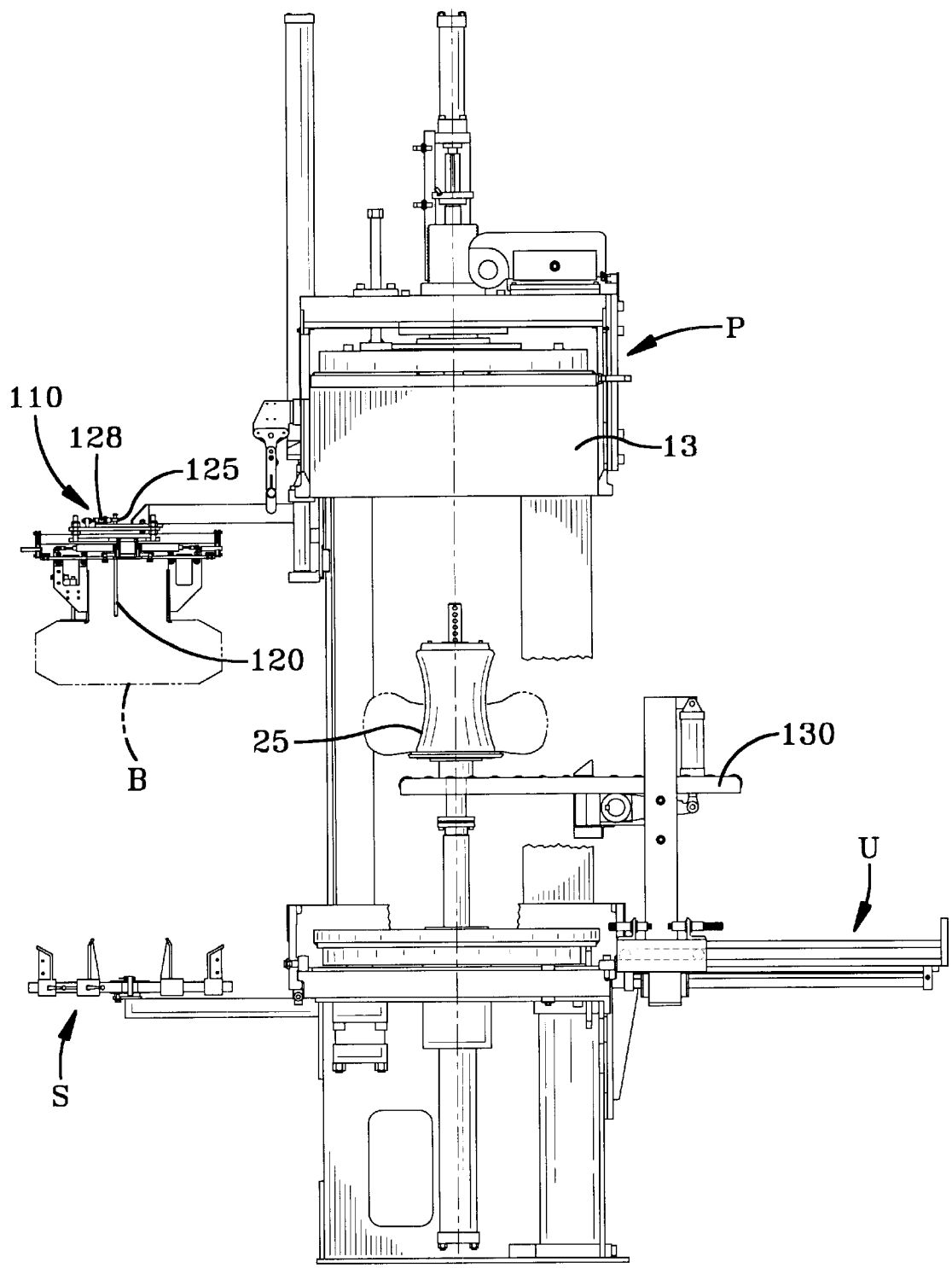

The lower bead ring 30 is selectively positioned in register with the lower mold section 12 as depicted in FIG. 1 or vertically extended thereabove as depicted, for example, in FIG. 9 by a cylinder mechanism, generally indicated by the numeral 35 in FIG. 1. The cylinder mechanism 35 has a generally annular housing 36, which is fixed in a central bore in bolster 15 of press 11, that contains an outer cylinder casing 37. An outer piston rod 38 of outer cylinder 37 carries at its upper end a bladder-mounting hub 39 that is exteriorly threaded for selective attachment to the interiorly threaded lower plate ring 31.

The vertical actuation of lower bead ring 30 is effected by an outer piston 40 on outer piston rod 38, which selectively controllably moves within outer cylinder 37. The outer piston 40 is preferably located at the lower extremity of outer piston rod 38. As shown, the outer piston 40 moves between a bottom cap 41 at the lower extremity of outer cylinder casing 37 and a sealing collar 42 at the upper extremity of outer cylinder casing 37. The stroke of piston 40 between the solid line position of FIG. 1 and the chain line position 40' is effected by the ingress and egress of operating fluid through bore 43 in bottom cap 41 and bore 44 in sealing collar 42, which communicate with the interior of outer cylinder casing 37 below and above piston 40, respectively. The operating fluid is preferably oil or a water-glycol mixture wherein substantially higher pressures can be employed than with conventional water systems. This permits a down-sizing of cylinder mechanism 35 while retaining the necessary operating force piston 40 imparts to outer piston rod 38.

The upper bead area 27 of bladder or bag 25 is engaged between an upper plate ring 50 and a cooperating clamp ring 51 that are detachably secured by bolts 52 for bladder change. The upper bead area 27 of bladder 25 is movable to the extent necessary to provide the variation in bladder bead spacing depicted in FIG. 2 as contrasted with FIG. 9 by a cylinder mechanism, generally indicated by the numeral 55. The cylinder mechanism 55 has a post or inner piston rod 56 to which the upper plate ring 50 is selectively axially secured by a stretch height control mechanism, generally indicated by the numeral 57, which is described in detail hereinafter. The piston rod 56 extends through and is supported by a seal pack 58 positioned within the bladder mounting hub 39 of cylinder casing 37. The seal pack 58 is designed to contain high pressure cure media within bladder 25 whether a liquid or gas media is employed. Piston rod 56 further extends through a central bore portion 39'of outer piston rod 38 and into a bore 38' of outer piston rod 38 wherein it is attached to a piston 60 that moves within the confines of the lower bore portion 38' of outer piston rod 38. The piston rod 38 thus also serves as a cylinder casing for piston 60.

The central bore 39' of hub 39 and the bore 38' of piston rod 38 are joined but maintained in fluid-tight and heat-transfer separation by a connector assembly, generally indicated by the numeral 65. As shown, an annular heat insulator 66 is interposed between a radially extending flange 67 at the lower extremity of hub 39 and a radially extending flange 68 at the upper end of piston rod 38. The flanges 67 and 68 are joined by a plurality of cap screws 69 spaced circumferentially thereabout. A gland 70 carrying seals 71 extends below connected assembly 65 between piston rod 56 and bore 38' of piston rod 38 to maintain the operating fluid for piston 60 contained within bore 38'. Thus, both the insulator 66 and the substantial vertical extend of bladder mounting hub 39 serve to prevent the transfer of heat from the curing media in bladder 25 and mold section 12 to the operating fluids for pistons 40 and 60.

In the event it is desired to supplement cooling of hub 39 and piston rod 56, cooling media may be circulated in central bore 39' of hub 39. To that end, hub 39 may be provided with an aperture 72 for introducing cooling air or other fluid through a suitable fitting (not shown). One or more bleed holes 73 may be provided preferably proximate the connector assembly 65 to permit escape of the cooling media to thus establish a circulation path through central bore 39' of hub 39. As shown, radial bleed hole 73 is provided in flange 67 abutting annular insulator 66. Alternatively, the bleed hole 73 could be readily located in flange 68 abutting the insulator 66 or in the annular insulator 66 itself.

The piston 60 moves between its lower solid line position and its upper phantom line position 60' in the bore 38' of piston rod 38. This movement is effected by the controlled ingress and egress of operating fluid through a bore 61 intercepting a channel 62 circumferentially surrounding bore 38' and communicating with the lower extremity thereof below piston 60 in the piston rod 38 and a bore 63 in piston rod 38 proximate the connector 65. The operating fluid controlling piston 60 in bore 38' of piston rod 38 may advantageously be of the same type as discussed above in conjunction with piston 40 and may advantageously be supplied from a common source for a given tire curing press.

In order to accommodate a range in tire sizes to be cured in a press employing the center mechanism 10, the initial position of piston rod 56 relative to the upper plate ring 50 in its lowermost position is established by the previously-identified stretch-height control mechanism 57. Stretch-height control mechanism 57 has an adjusting sleeve 80 that is positioned centrally of upper plate ring 50 in alignment with a bore 81 therein that receives the piston rod 56. A seal in the form of an O-ring 82 is provided between piston rod 56 and upper plate ring 50 to preclude the escape of curing media from within the bladder 25. The adjusting sleeve 80 has a plurality of apertures 83 at different locations along its axial length. Adjusting sleeve 80 is positioned on upper plate ring 50 in alignment with bore 81 but in a manner permitting rotational adjustment by a retainer ring 84 that overlies a projecting flange 85 at the base of sleeve 80 and is affixed to upper plate ring 50 by a plurality of cap screws 86.

Figure 2:
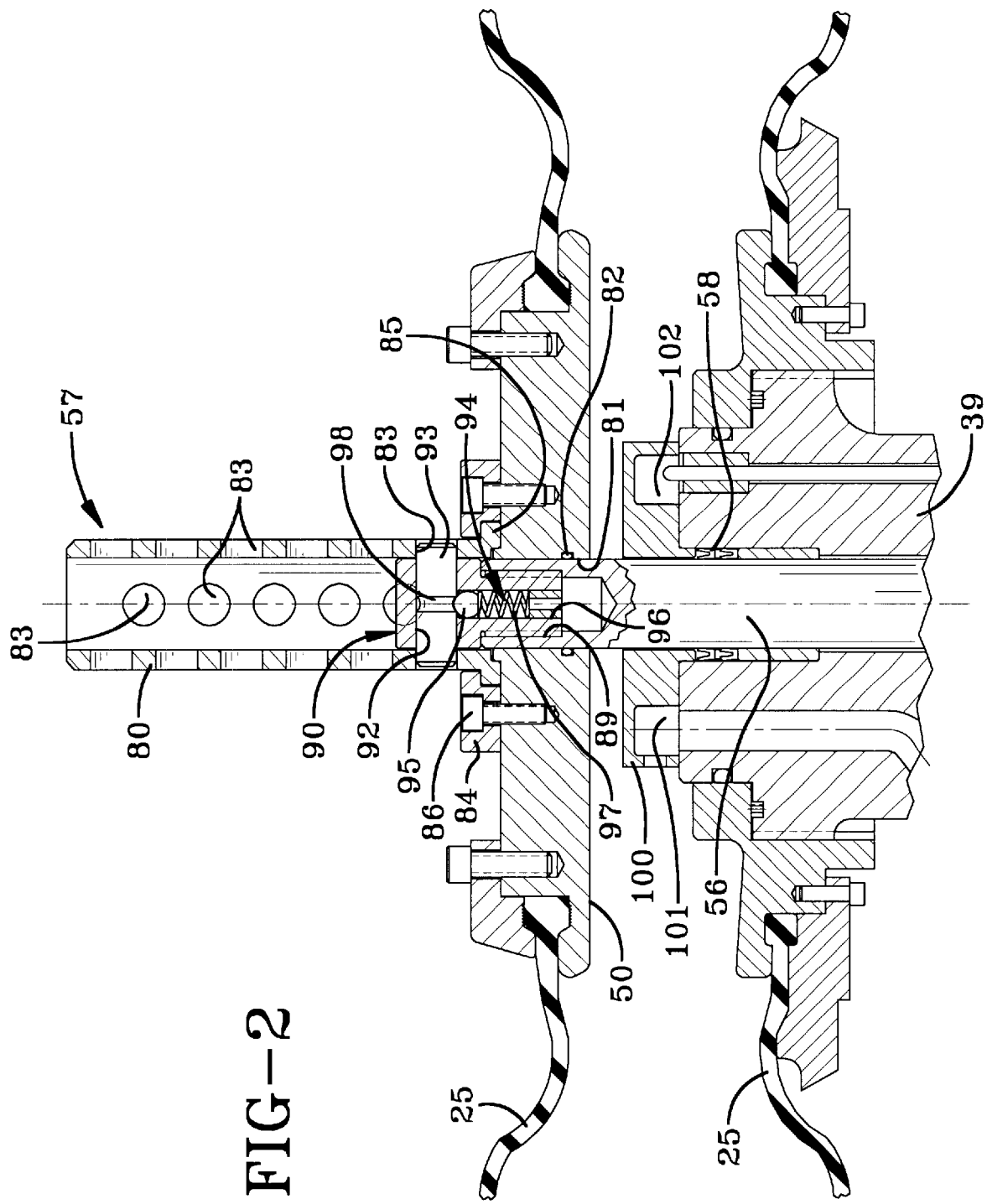
FIG. 2 is an enlarged, fragmentary view of a portion of FIG. 1, designated as FIG. 2 and showing details of a stretch-height control mechanism for adjusting the center mechanism to accommodate a range of tire sizes.

The piston rod 56 interacts with adjusting sleeve 80 through a pin-retaining assembly 90. Pin-retaining assembly 90 attaches to the upper extremity of piston rod 56 by engaging a threaded bore 89 in the axial extremity thereof. The pin-retaining assembly 90 has a head 91 having a transverse bore 92 for receiving a pin 93. The pin 93 is of greater axial extent than the diameter of the head 91 of pin-retaining assembly 90 such that the axial extremities of pin 93 engage apertures 83 in adjusting sleeve 80, as depicted in FIG. 2. The pin 93 is operationally retained in the position depicted in FIG. 2 but selectively removable for adjustment purposes by a ball-lock assembly 94 in pin-retaining assembly 90. The ball-lock assembly 94 consists of a ball 95 positioned in a bore 96 and biased into engagement with pin 93 as by a spring 97. The pin 93 is provided with a medial circumferential groove 98 in which the ball 95 is normally seated in the manner depicted in FIG. 2 to effect retention of pin 93 during normal operation of center mechanism 10. Application of an axial force to pin 93 permits removal of pin 93 when it is necessary to adjust the position of piston rod 76 relative to the adjusting sleeve 80 by moving pin 93 to another selected aperture 83 in adjusting sleeve 80. The number of apertures 83 in adjusting sleeve 80 may be dictated by the range of tire sizes to be cured in the press. As will be appreciated, the lowest aperture 85 in sleeve 80 would be engaged with pin 93, as shown in FIG. 2, for the largest tire size. The top aperture 83 of adjusting sleeve 80 would be employed for the smallest tire size, with the intermediate apertures 83 being employed for intermediate tire sizes. If desired, dedicated sleeves could be made with a single aperture 93 for each size of tire to be processed on the press.

The hub 39 is provided with a cap plate 100 that reposes internally of the bladder 25. The cap plate 100 is provided with passages 101 and 102 that exit internally of the bladder 25 and provide for input and output of curing media, as previously described, internally of the bladder 25. The ingress and egress of curing fluid through passages 101, 102 thus supply the shaping and curing fluids employed in press operating cycles during the shaping and curing of an uncured tire band and the drainage of the curing media subsequent to the curing cycle. The passages 101 and 102 may be serviced in a conventional manner by pipes 103 attached to the hub 39. A limit-switch assembly, generally indicated by the numeral 105, may be mounted on annular housing 36 and engage pipe 103 to signal the extent of travel of lower bead ring 30 as effected by movement of piston 40.

Stack-height control, which is part of the bladder insertion technique with an upstanding bladder 25 of the type disclosed herein, requires positioning of upper plate ring 50 in relation to the top bead of a green or uncured radial tire band B, as depicted in FIGS. 5–8 of the drawings. The stack-height control is achieved in a manner hereinafter described by a bladder detector mechanism, generally indicated by the numeral 110 in FIG. 3 of the drawings. The bladder detector mechanism 110 is mounted on a loader, generally indicated by the numeral 112, for the press. As shown, the loader 112 consists of a framework 113 that suspends loader-shoe assemblies 114 from a plurality of arms 115. The loader-shoe assemblies 114 have spine plates 116 for engaging the upper bead of an uncured tire band B. The shoe assemblies 114 are movable inwardly and outwardly to selectively grip and release an uncured tire band B. A tire loader 112 of the type depicted in FIG. 3 of the drawings is shown in detail in U.S. Pat. No. 5,716,089 owned by Applicant's assignee, to which reference is made for further particulars of the loader 112. It is to be appreciated, however, that bladder detector mechanism 110 may be employed in conjunction with a wide variety of loader and loader basket designs that exist in the art.

Figure 4:
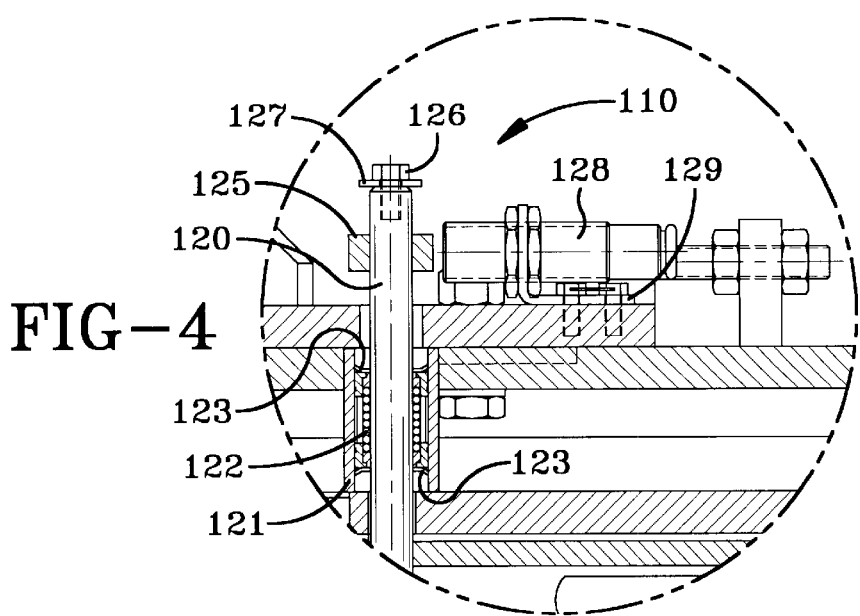
FIG. 4 is an enlarged, fragmentary, cross-sectional view of the portion of the bladder detector mechanism of FIG. 3, designated as FIG. 4 and showing details of a bladder detector rod and interrelated proximity switch.
Figure 3:
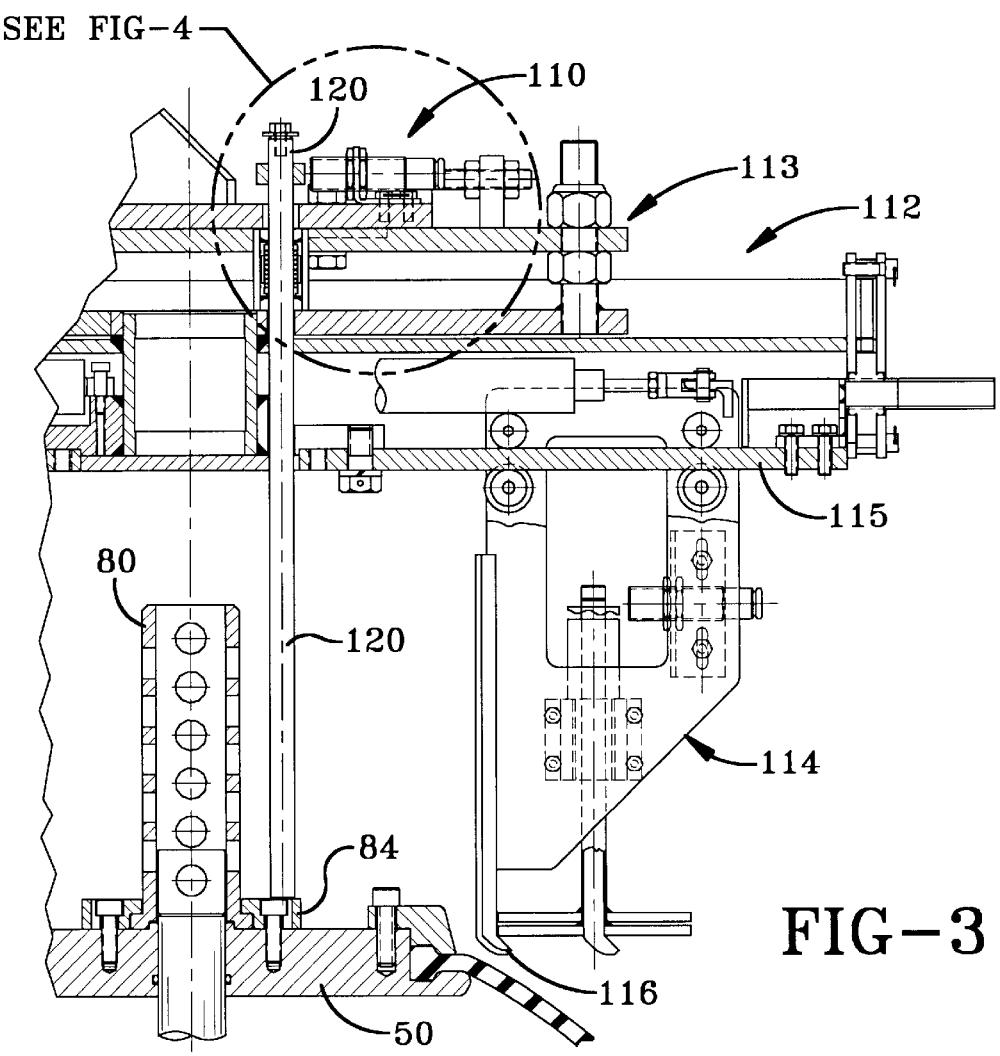
FIG. 3 is a fragmentary, elevational view of an exemplary tire curing press loader showing the mounting of a bladder detector mechanism according to the present invention for use in conjunction with a center mechanism according to the present invention.

As shown in FIG. 3, the bladder detector mechanism 110 is mounted on the framework 113. A primary operating component of bladder detector mechanism 110 is a bladder detector rod 120, which, as seen in FIGS. 3 and 4, is vertically suspended from the loader 112. The bladder detector rod 120 is supported and guided in its vertical movements by a pillow block 121 that is attached to the loader 112. The pillow block 121 and bladder detector rod 120 are positioned generally centrally of but offset from the center of the loader 112, as best seen in FIG. 3. As shown, the bladder detector rod 120 engages the retainer ring 84 for adjusting sleeve 80 when the upper plate ring 50 moves upwardly and downwardly within the confines of shoes 114 of the loader 112. It will thus be appreciated that bladder detector rod 120 is vertically movable as a function of the relative position of upper plate ring 50 vertically with respect to loader 112.

The pillow block 121 carries internally thereof a ball bushing 122 that supports the bladder detector rod 120 for free vertical movement relative thereto. The ball bushing 122 is maintained in position within the pillow block 121 by retaining rings 123 at each axial extremity thereof. Upwardly of the pillow block 121, the bladder detector rod 120 carries a clamp block 125 that may be fixed on rod 120 at any selected position axially there along. The upper extremity of rod 120 may be fitted with a cap screw 126 and lock washer 127 to retain clamp block on rod 120 during adjustment thereof. The bladder detector mechanism 110 also includes a sensor such as a proximity switch 128 that is adjustably affixed to loader 112 by a mounting bracket 129. Proximity switch 128 is positioned in the manner shown in FIG. 4, such that the switch is activated when the clamp block 125 is in substantial alignment therewith. At all other times, proximity switch 128 is deactivated. As can be appreciated from FIG. 3 of the drawings, the proximity switch 128 is actuated to stop the lowering of the upper plate ring 50 when it is substantially horizontally aligned with the lower extremity of the spine plates 116 that engage the upper bead of an uncured tire band B. It is to be appreciated that precise positioning for a particular uncured tire configuration can be effected by merely adjusting the position of clamp block 125 axially along bladder detector rod 120. It will also be apparent that a limit switch or other sensor may be employed to signal a desired relationship of clamp block 125 and loader 112.

Exemplary operation of a center mechanism 10 installed on a press P in accordance with the concepts of the present invention is depicted in the sequence-of-operation views, FIGS. 5–10, inclusive, of the drawings. Although variations may be apparent to persons skilled in the art, the following description constitutes an exemplary sequence for the handling of a commonly configured green radial tire band B.

FIG. 5 depicts the center mechanism 10 in a normal condition for receipt of an uncured tire band B. The lower bead ring 30 is positioned in register with lower mold section 12, with the piston 40 in the solid-line position depicted in FIG. 1 of the drawings. The cylinder mechanism 55 has moved the piston 60 to the chain-line position 60' of FIG. 1 to effect vertical stretching of the bladder 25 by vertically upwardly displacing the upper plate ring 50 carried by piston rod 56. As seen in FIG. 5, the bladder 25 may be radially medially depressed to an extent by the introduction of a low vacuum internally of the bladder 25. The loader L has previously picked up a green tire band B from a tire stand S, holder, or the like, and has moved the tire band into vertical alignment with the bladder 25. As shown, the tire band B is suspended by engagement of the shoes 114 of loader 110 with its upper bead area. The bladder detector rod 120 is gravity suspended at its lowermost position based upon the location of the clamp block 125.

Figure 6:
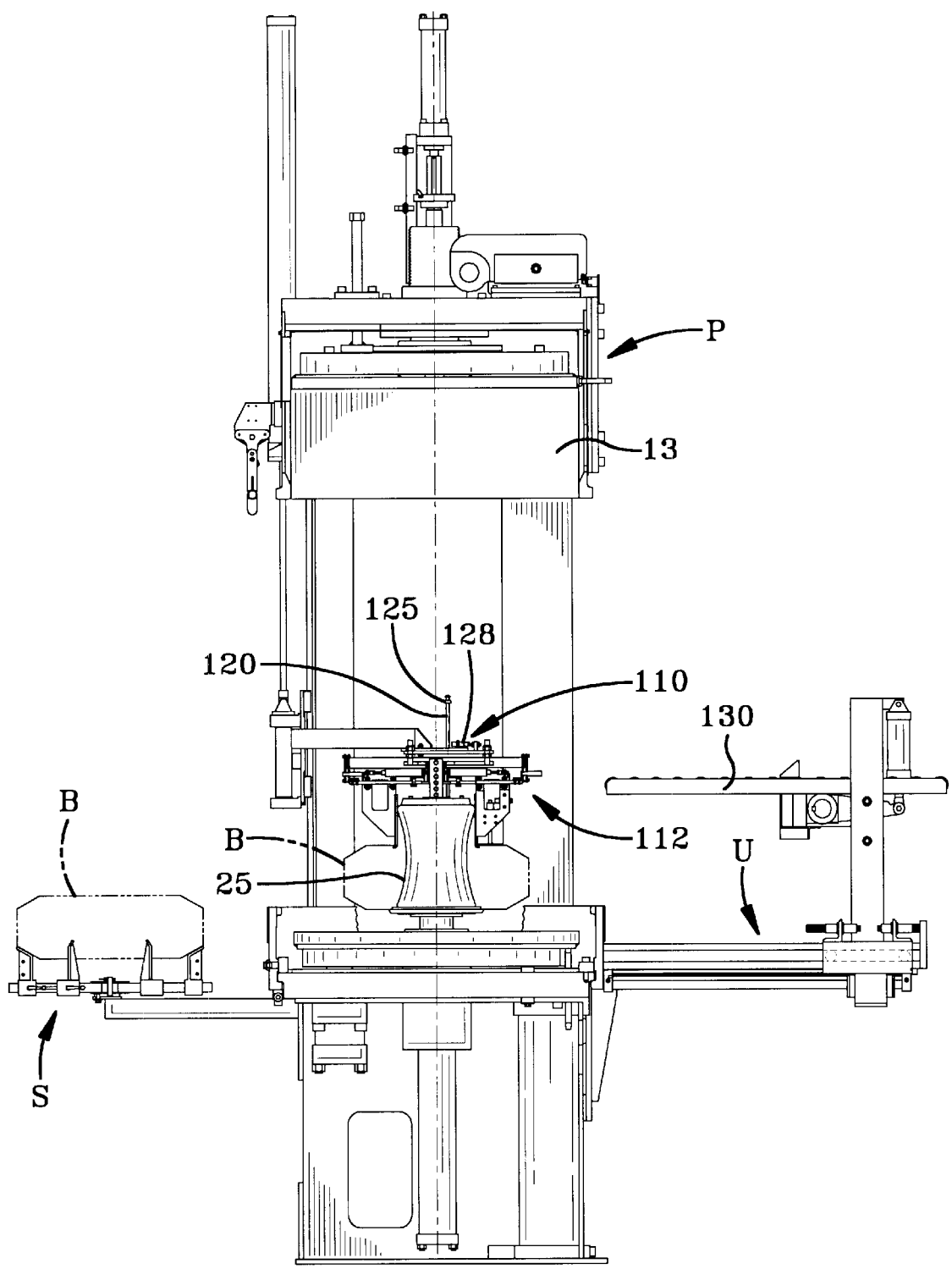

Referring now to FIG. 6, the loader 110 has been vertically lowered to a predetermined position, with the lower bead of tire band B at a predetermined position proximate to the lower bead ring 30 and lower mold section 12 (FIG. 1). The bladder detector rod 120 has been displaced vertically upwardly relative to the loader 110 and proximity switch 128 so that clamp block 125 is displaced thereabove by virtue of the extremity of bladder detector rod 120 having engaged and displaced by upper plate ring 50 as it moves within the confines of shoes 114 of loader 110.

Figure 7:
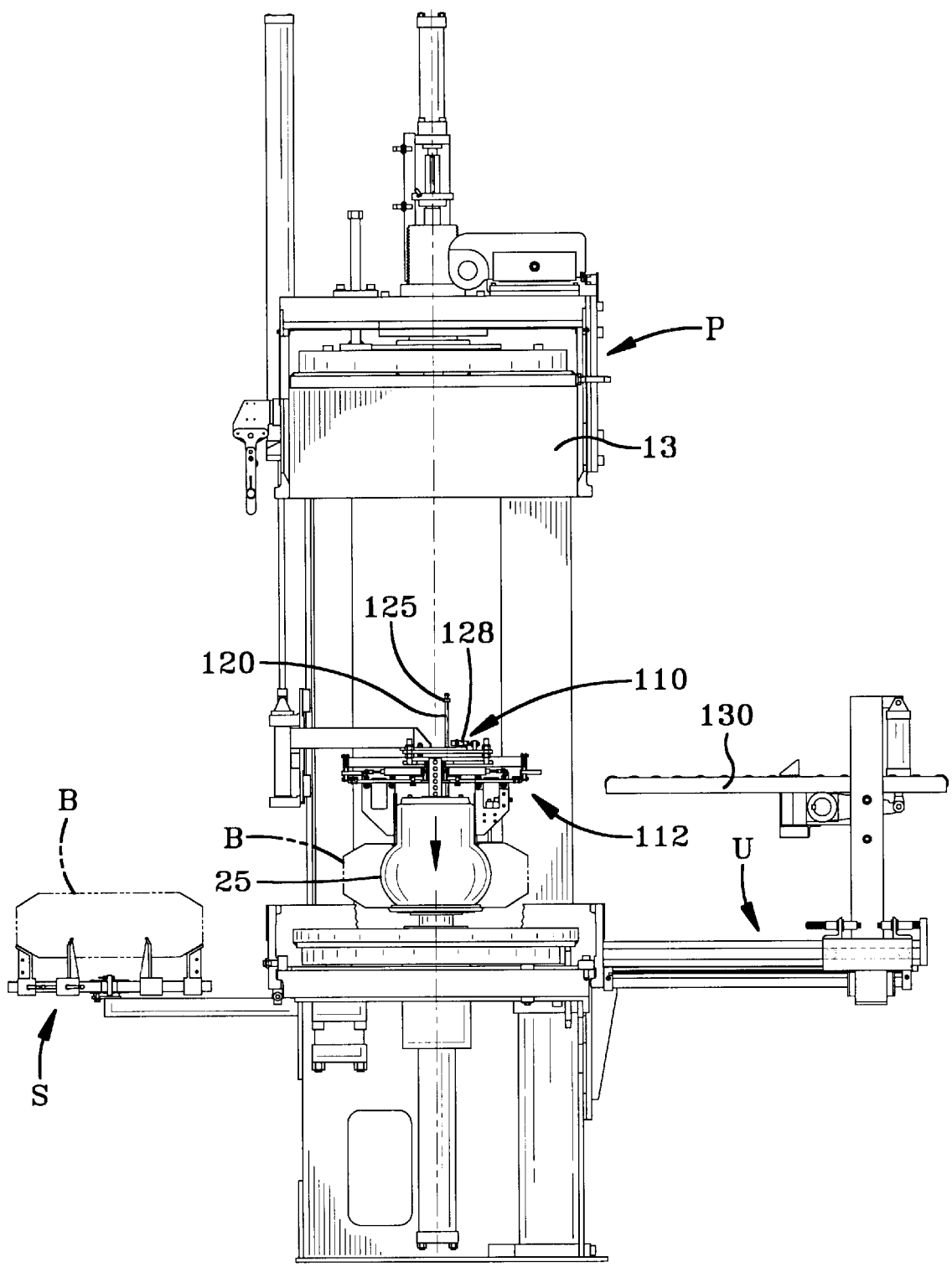

Referring now to FIG. 7, which is sequential to FIG. 6, the upper plate ring 50 is in the process of moving downwardly as a result of downward movement of the piston 60 of cylinder mechanism 55. Contemporaneously therewith, bladder detector rod 120 moves vertically downwardly by gravity forces operative thereon with the lowering of upper plate ring 50. At the same time, shaping pressure is introduced into the bladder 25 to effect its radial outward expansion within the tire band B.

Figure 8:
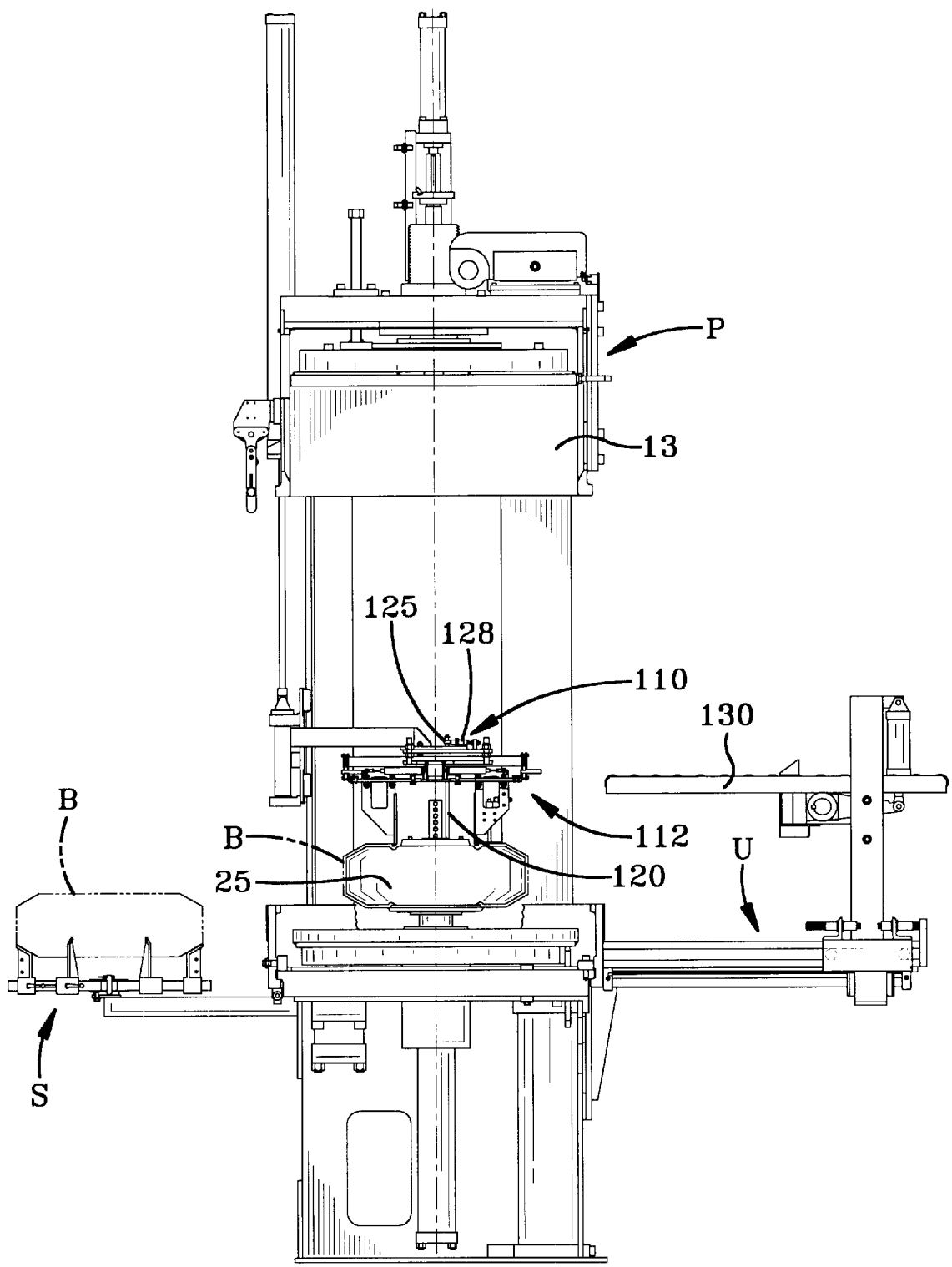

When the upper plate ring 50 reaches a predetermined position relative to the upper bead of the tire band B, the clamp block 125 is positioned in the sensing position of the proximity switch 128, the actuation of which controls the supply of operating media to piston 60 to stop and maintain piston 60 in the desired position of the upper plate ring 50 relative to the top bead of tire band B, as depicted in FIG. 8.

Thereafter, the shoes 40 of loader 112 are retracted to release the upper bead of the tire band B. The loader 112 is then moved vertically and laterally to the position shown in FIG. 9. The press P is then closed in conventional fashion, with the upper mold section mounted within press head 13, brought into mating engagement with the lower mold section 12. Thereafter, full curing pressure is applied interiorly of the bladder 25, which, over a suitable time period, effects full cure of the tire band B in cooperation with the heat provided to the mold sections by the platens. After completion of the cure cycle, the high-pressure curing fluid is scavenged from the bladder, and the press head is opened.

Figure 10:
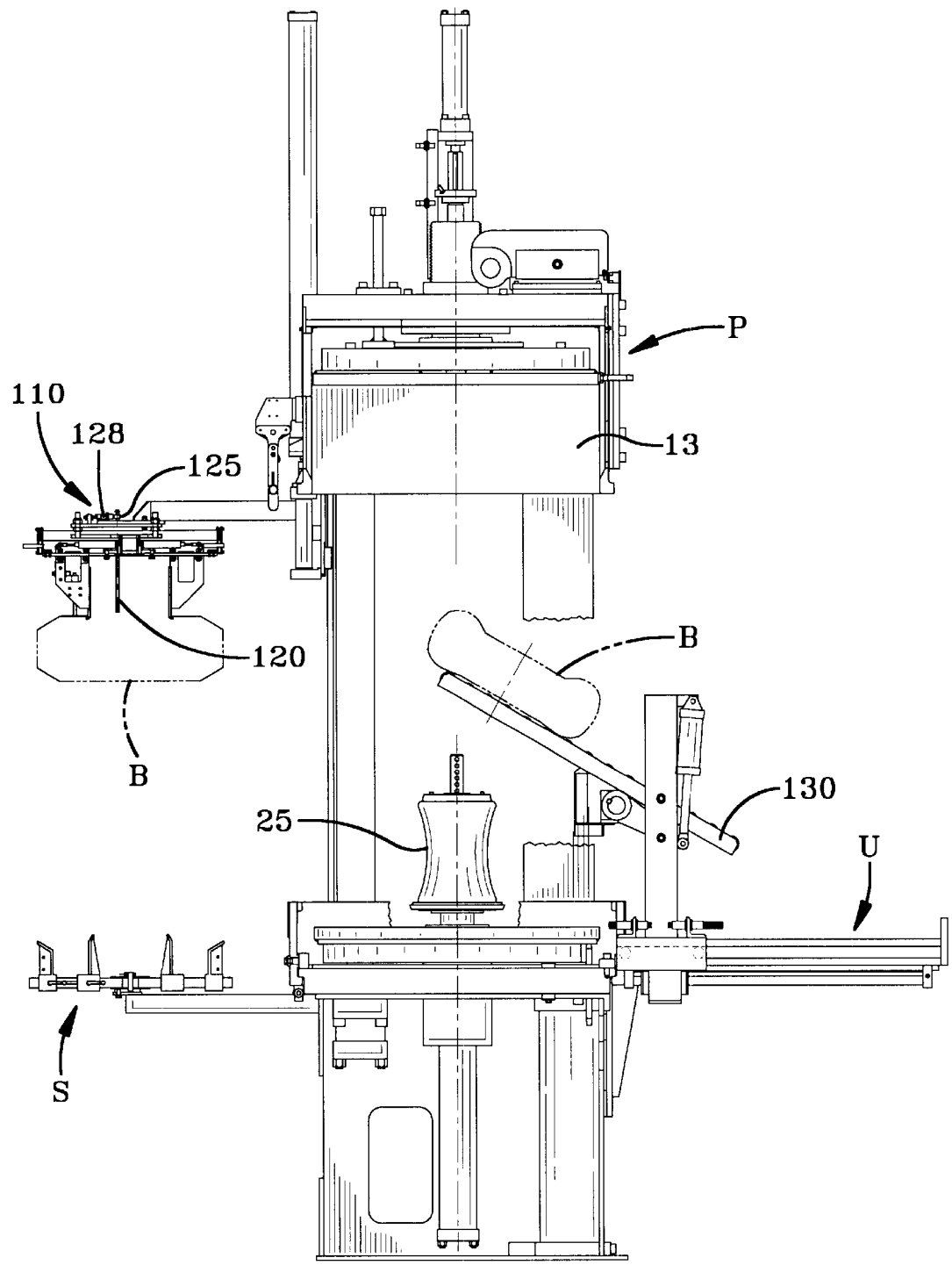

FIG. 9 depicts the center mechanism 10 after cylinder mechanism 35 has moved lower bead ring 30 to its raised or extended position wherein piston 40 has moved from the solid-line position of FIG. 1 to the chain-line position 40'. In addition, cylinder mechanism 55 has extended bladder 25 to its stretched position by movement of piston 60 from the solid-line position of FIG. 1 to the chain-line position 60', which strips the bladder 25 from within the cured tire band B. FIG. 9 also shows an exemplary unloader, generally indicated by the letter U, having arms 130 that have been moved into position under the lower bead ring 30. Thereafter, lowering the lower bead ring 30 by moving piston 40 from the chain-line position 40' to the solid-line position 40 in FIG. 1 strips the lower bead of the tire from the cured tire band B and returns the center mechanism to the position depicted in FIG. 10. The unloader U may then be manipulated as by tilting of the arms 130, as shown in FIG. 10, to effect discharge of the cured tire band B from the press. Withdrawal of the unloader U from the FIG. 10 position to the FIG. 5 position places the center mechanism 10 in condition for receiving a further uncured tire band B and a repetition of the operating cycle described herein.

Thus, it should be evident that the tire curing press center mechanism disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

What is claimed is:

1. A center mechanism for manipulating a bladder in a tire curing press comprising, a lower plate ring for carrying a lower bead of the bladder, an upper plate ring for carrying an upper bead of the bladder, a first cylinder mechanism for selectively moving said lower plate ring and said upper plate ring, a hub mounted centrally of and extending a substantial axial distance below said lower plate ring, a piston rod attached to said upper plate ring and extending through said hub, a first sealing member mounted in said hub proximate said lower plate ring and engaging said piston rod to retain curing medium within the bladder, a second cylinder mechanism attached to said hub for selectively actuating said piston rod, a second sealing member in said second cylinder mechanism for maintaining cylinder operating fluid in said second cylinder mechanism, and a heat insulator interposed between said hub and said second cylinder mechanism, whereby said curing medium and said cylinder operating fluids are separated by said substantial axial distance said hub extends below said lower plate ring, and by said heat insulator to prevent heat transfer from said curing medium to said cylinder operating fluids.

2. A center mechanism according to claim 1, wherein said second cylinder mechanism is positioned within said first cylinder mechanism.

3. A center mechanism according to claim 1, wherein a connector assembly joins said hub and said second cylinder mechanism, said connector assembly including flanges on said hub and said second cylinder assembly and an annular heat insulator interposed therebetween.

4. A center mechanism according to claim 3, wherein said second sealing member is a gland positioned between said piston rod and said connector assembly.

5. A center mechanism for manipulating a bladder in a tire curing press comprising, a lower plate ring for carrying a lower bead of the bladder, an upper plate ring for carrying an upper bead of the bladder, a first cylinder mechanism for selectively moving said lower plate ring and said upper plate ring, a hub mounted centrally of and extending a substantial axial distance below said lower plate ring, a piston rod attached to said upper plate ring and extending through said hub, a first sealing member mounted in said hub proximate said lower plate ring and engaging said piston rod to retain curing medium within the bladder, a second cylinder mechanism attached to said hub for selectively actuating said piston rod, and a second sealing member in said second cylinder mechanism for maintaining cylinder operating fluid in said second cylinder mechanism, said hub having apertures for circulating cooling fluid within said hub between said first sealing member and said second sealing member, whereby said curing medium and said cylinder operating fluid are separated by said substantial axial distance said hub extends below said lower plate ring and said cooling fluid.

6. A control mechanism for a tire curing press center mechanism having a bladder with a lower bead carried by a lower plate ring and an upper bead carried by an upper plate ring and having a piston rod attached to said upper plate ring for movement of said upper plate ring relative to said lower plate ring comprising, an adjusting sleeve adapted to be mounted on the upper plate ring and having a plurality of apertures, a pin retaining assembly on the piston rod having a transverse bore, and a pin selectively interconnecting both said bore of said pin retaining assembly and one of said plurality of apertures of said adjusting sleeve, said plurality of apertures being axially-spaced and circumferentially offset for receiving said pin to achieve selective variable positioning of the piston rod axially of said adjusting sleeve.

7. A control mechanism for a tire curing press center mechanism according to claim 6, wherein said pin-retaining assembly has a ball-lock mechanism providing retention of said pin during operation of the center mechanism.

8. A control mechanism for a tire curing press center mechanism according to claim 6, wherein said pin has a circumferential groove and said ball-lock mechanism has a ball that is spring biased for seating engagement with said groove to retain said pin.

9. A bladder detector mechanism for a curing press for tires including a loader and a center mechanism having a bladder with a lower bead carried by a lower plate ring and an upper bead carried by an upper plate ring comprising, a rod suspended from the loader and vertically movable as a function of the position of the upper plate ring relative to the loader, the clamp block selectively positioned on said rod above the loader, and a sensor mounted on the loader for detecting a proximate position of said clamp block, and a control mechanism responsive to said sensor for controlling the position of the upper plate ring relative to the tires.

10. A bladder detector mechanism for a curing press for tires according to claim 9, wherein said sensor is a proximity switch.

11. A bladder detector mechanism for a curing press for tires according to claim 9 further comprising, a pillow block mounted on the loader and supporting said rod for free vertical movement relative thereto.

12. A bladder detector mechanism for a curing press for tires according to claim 11, wherein a retainer at the upper axial extremity of said rod maintains said rod in said pillow block during adjustment of said clamp block.

13. A bladder detector mechanism for a curing press for tires according to claim 9 further comprising a stretch-height control mechanism for adjusting the extent of movement of the upper plate ring relative to the loader.

14. Apparatus for manipulating a bladder relative to a tire suspended from a loader in a tire curing press comprising, a lower plate ring adapted for carrying a lower bead of the bladder, an upper plate ring adapted for carrying an upper bead of the bladder, a first cylinder mechanism for selectively moving said lower plate ring and said upper plate ring, a piston rod attached to said upper plate ring and extending through said lower plate ring, a second cylinder mechanism located within said first cylinder mechanism for selectively actuating said piston rod to move said upper plate ring relative to said lower plate ring, a stretch-height control mechanism for controlling the position of said upper plate ring relative to said lower plate ring upon actuation of said second cylinder, and a bladder detector mechanism for positioning said upper plate ring at a predetermined position relative to a tire in the tire curing press, said bladder detector mechanism having a detector member mounted on and movable relative to the loader and responsive to movement of the upper plate ring, a sensed element selectively affixed on said detector member, a sensor for detecting a proximate position of said sensed element, and a control mechanism responsive to said sensor for controlling the position of upper plate ring relative to the tire.

\* \* \* \* \*